United States Patent
Oda et al.

(10) Patent No.: US 8,716,911 B2
(45) Date of Patent: May 6, 2014

(54) MOTOR DEVICE WITH SUPPORT PART TO SUPPORT AN END OF A SHAFT

(75) Inventors: Shota Oda, Nagano (JP); Tetsuhiko Hara, Nagano (JP); Hideaki Ito, Nagano (JP)

(73) Assignee: Nidec Sankyo Corporation (JP)

( * ) Notice: Subject to any disclaimer, the term of this patent is extended or adjusted under 35 U.S.C. 154(b) by 411 days.

(21) Appl. No.: 13/003,382

(22) PCT Filed: Jul. 9, 2009

(86) PCT No.: PCT/JP2009/003217
§ 371 (c)(1),
(2), (4) Date: Jun. 21, 2011

(87) PCT Pub. No.: WO2010/004756
PCT Pub. Date: Jan. 14, 2010

(65) Prior Publication Data
US 2012/0038231 A1    Feb. 16, 2012

(30) Foreign Application Priority Data

Jul. 11, 2008  (JP) ................ 2008-181217
Jul. 11, 2008  (JP) ................ 2008-181218
Jul. 11, 2008  (JP) ................ 2008-181219

(51) Int. Cl.
*H02K 5/167*    (2006.01)
*H02K 37/14*    (2006.01)

(52) U.S. Cl.
USPC ............... 310/90; 310/91; 384/244; 384/610

(58) Field of Classification Search
USPC ............ 310/90, 91, 401, 425–428, 99; 384/244–246, 610
IPC ............................. H02K 5/167, 37/14
See application file for complete search history.

(56) References Cited

U.S. PATENT DOCUMENTS 2,030,260 A * 2/1936 Lewis ............................ 310/90
4,224,544 A * 9/1980 McKinnon et al. ............. 310/90
(Continued)

FOREIGN PATENT DOCUMENTS

| JP | 8-280155 A | 10/1996 |
|---|---|---|
| JP | 2003-47228 A | 2/2003 |

(Continued)

OTHER PUBLICATIONS

Machine translation of JP2003-047228 (published Feb. 14, 2003, translated Jul. 17, 2013).*
International Search Report for International Application No. PCT/JP2009/003217 with English translation dated Aug. 25, 2009.

*Primary Examiner* — Burton Mullins
*Assistant Examiner* — Michael Andrews
(74) *Attorney, Agent, or Firm* — Cantor Colburn LLP

(57) ABSTRACT

Provided is a motor device in which the entire length of a motor can be shortened as much as possible while the positional deviation of a shaft in a thrust direction is prevented and a shaft length sufficient to suppress the inclination of the shaft can be ensured. A motor device provided with a shaft with a rotor fixed on the outer surface thereof, and a thrust pressurization unit that supports an end opposite the output side of the shaft while pressurizing the end in an axial direction may be configured so that the thrust pressurization unit may be provided with a coil spring that pressurizes the end opposite the output side of the shaft in the axial direction and the thrust pressurization unit may be disposed inside the rotor.

9 Claims, 7 Drawing Sheets

(56) References Cited

U.S. PATENT DOCUMENTS

| | | | |
|---|---|---|---|
| 5,144,738 A * | 9/1992 | Oyafuso | 310/90 |
| 6,809,447 B1 * | 10/2004 | Danish et al. | 310/90 |
| 6,951,424 B2 * | 10/2005 | Mutai et al. | 384/610 |
| 2008/0088209 A1 | 4/2008 | Ryu | |

FOREIGN PATENT DOCUMENTS

| | | | |
|---|---|---|---|
| JP | 2003047228 A * | 2/2003 | H02K 37/24 |
| JP | 2006-174595 A | 6/2006 | |
| JP | 2008-99550 A | 4/2008 | |
| KR | 10-2008-0034298 A | 4/2008 | |

* cited by examiner

MOTOR DEVICE WITH SUPPORT PART TO SUPPORT AN END OF A SHAFT

CROSS REFERENCE TO RELATED APPLICATIONS

This is a U.S. national stage of international application No. PCT/JP2009/003217, filed on Jul. 9, 2009. Priority under 35 U.S.C. §119(a) and 35 U.S.C. §365(b) is claimed from Japanese Applications Nos. 2008-181217, filed Jul. 11, 2008; 2008-181218, filed Jul. 11, 2008; and 2008-181219, filed Jul. 11, 2008; the disclosures of each of which are also incorporated herein by reference.

TECHNICAL FIELD

The present invention relates to a motor device. More specifically, at least an embodiment of the present invention relates to a motor device in which a shaft to which a rotor is fixed is supported while pressurized in an axial direction by a coil spring, a motor device in which an end part of a shaft is rotatably supported through a ball that is held by a bearing member, and a motor device which is provided with a support part that supports an output side end part of a shaft protruded from an output side end face of a stator.

BACKGROUND

A motor has been conventionally proposed which is provided with a thrust pressurization part that pressurizes one end of a shaft in an axial direction for suppressing positional displacement of the shaft in the axial direction. A flat spring or a coil spring having a cylindrical shape is used as a pressurization means that is used in the thrust pressurization part. Since a coil spring having a cylindrical shape is provided with a relatively large pressurization (urging) force, a coil spring is used for obtaining a relatively high effect for preventing positional displacement of the shaft.

In Patent Literature 1, a structure is described in which, in a motor device using a coil spring having a cylindrical shape, a thrust pressurization part is accommodated in an inside of a lead screw (shaft). According to this structure, the dimension of the motor (total length of motor) in the axial direction of the shaft can be shortened as much as possible while sufficiently securing stability of the pressurization mechanism to the shaft.

In Patent Literature 2, a structure of a motor device is proposed in which an end part of a shaft is rotatably supported through a ball that is held by a bearing member and the bearing member is held in an opening part (through hole) in a state urged in an axial direction of the shaft by a coil spring for preventing positional displacement in the axial direction of the shaft. In other words, since the bearing member is held in the opening part in a slidable state in the axial direction, a clearance is formed between an outer peripheral face of the bearing member and an inner peripheral face of the opening part.

In Patent Literature 3, a motor device is described which is provided with a support part supporting an output side end part of a shaft that is protruded from an output side end face of a stator and, in which a shaft frame is fixed to the output side end face of the stator and a support part by which the output side end part of the shaft is supported is provided at a tip end of the shaft frame. The shaft is rotationally supported by a ball that is held by the support part. The support part is fixed to a hole that is formed at the tip end of the shaft frame. The shaft of the motor described in the former Patent Literatures is formed with a lead screw part. The lead screw part is normally engaged with a driven body referred to as a carriage or the like and the driven body is moved back and forth in the axial direction of the shaft.

[PTL 1] Japanese Patent Laid-Open No. Hei 8-280155
[PTL 2] Japanese Patent Laid-Open No. 2006-174595

However, in the structure described in Patent Literature 1, since the coil spring in a cylindrical shape is provided in the inside of the lead screw, workability is not satisfactory when the compression coil spring is to be accommodated in the inside of the lead screw. Further, since the coil spring is accommodated in the inside of the lead screw, a wire diameter and a distance between coil wires of the coil spring in a cylindrical shape are limited and thus a sufficient pressurization cannot be applied to the shaft.

In the structure described in Patent Literature 2, the clearance causes the following problems. In other words, when the bearing member is inclined within the opening part due to the clearance, the position of the ball held by the bearing member is varied and thus the shaft supported by the ball in an abutted state is inclined. In association with this matter, in designing the motor, a sufficient space is required between an outer peripheral face of a rotor and an inner peripheral face of a stator so that the rotor is not contacted with the stator (coil). Therefore, a main body portion (stator) of the motor is enlarged in the radial direction.

In the structure described in Patent Literature 2, for example, as shown in FIG. 7, if simply changed to a structure where the lead screw part is replaced with a pinion 92 and a rotational force of a motor 90 is outputted through a gear 94 which is engaged with the pinion 92, an external force is applied to the shaft in a direction perpendicular to the axial direction (pinion 92) and thus a shaft frame 96 may be deformed by the external force. As a result, the position of a support part 98 by which an end part 92a of the shaft is supported is displaced and thus an outer wall of the rotor and an inner wall of the stator may be interfered with each other. Further, in the worst case, the shaft may be disengaged from the support part 98 or the bearing member 98a structuring the support part 98 may be detached from a mounting hole 96a which is formed at the tip end of the shaft frame.

In view of the problems described above, it is desirable to provide a motor device which is capable of securing a satisfactory workability when a thrust pressurization part is to be arranged on an inner side of a rotor, securing a sufficient pressurization force by a coil spring to a shaft and, in addition, increasing a length in an axial direction of the shaft as much as possible.

It is further desirable to provide a motor device which prevents inclination of the shaft occurring with inclination of the bearing member to restrain increase of the motor size.

It is further desirable to provide a motor device in which, in a motor having a pinion with which a gear is engaged for transmitting a driving force from the motor to an output shaft, a trouble is prevented which occurs when an external force acts on the shaft in a direction perpendicular to the axial direction of the shaft.

SUMMARY

In order to attain the above advantages, at least an embodiment of the present invention provides a motor device including a shaft which is fixed with a rotor on its outer peripheral face, and a thrust pressurization part which supports or is structured to support an opposite-to-output side end part of the shaft while pressurizing the shaft in an axial direction. The thrust pressurization part includes a coil spring which is formed in a conical shape and pressurizes or is structured to pressurize the opposite-to-output side end part of the shaft in the axial direction, and the thrust pressurization part is disposed on an inner side of the rotor.

According to the motor device in accordance with at least an embodiment of the present invention, the thrust pressurization part which supports or is structured to support the opposite-to-output side end part of the shaft while pressurizing in the axial direction is disposed on the inner side of the rotor, the total length of the motor is prevented from being large due to providing the thrust pressurization part. Further, since the coil spring which is provided in the thrust pressurization part is accommodated on the inner side of the rotor, workability at the time of assembling is superior in comparison with a case that the thrust pressurization part is accommodated on an inner side of the shaft. Further, the diameter of the coil spring can be set larger and thus a pressurization force to the shaft is secured sufficiently. Moreover, since the coil spring which is provided in the thrust pressurization part is formed in a conical shape, a compressed length in the pressurization direction is shorter in comparison with a case that a coil spring in a normal cylindrical shape is used. In other words, since the coil spring is formed in a conical shape, when compressed, the small diameter part and the large diameter part of a winding diameter of the coil wire structuring the coil spring is overlapped with each other in the axial direction and thus the size of the thrust pressurization part in the axial direction can be made relatively small. Therefore, the length of the shaft can be made relatively long without changing the size of the total length of the motor device in the axial direction and thus, in comparison with a case that the length of the shaft is relatively short, when positional displacement in the radial direction is the same as each other, inclination of the shaft is relatively small. Further, noise, vibration, torque loss and the like are reduced.

In this case, it is further preferable that the thrust pressurization part further includes a ball which is abutted with the opposite-to-output side end part of the shaft, and a bearing member which supports or is structured to support the opposite-to-output side end part of the shaft through the ball and is pressurized by the coil spring in the axial direction, and that the bearing member includes an opposite-to-output side slide part which holds or is structured to hold the ball, and a reinforcing part which reinforces the opposite-to-output side slide part and is protruded to an opposite-to-output side, and the reinforcing part is disposed on an inner side of the coil spring.

As described above, when the bearing member is provided with the reinforcing part which reinforces the opposite-to-output side slide part, the position of the ball can be located closer to the coil spring which is disposed on the opposite-to-output side of the bearing member and the length of the shaft can be set longer by that amount and thus inclination of the shaft is restrained relatively small. In other words, when the position of the ball which supports or is structured to support the opposite-to-output side end part of the shaft is located on the opposite-to-output side as much as possible for setting the length of the shaft longer, the bottom part of the opposite-to-output side slide part becomes thin and its strength is lowered. In order to prevent this matter, according to at least an embodiment of the present invention, the reinforcing part is provided on the opposite-to-output side of the bearing member for securing a sufficient mechanical strength of the opposite-to-output side slide part and, in addition, the reinforcing part is located on the inner side of the coil spring. Therefore, while the increase of the total length of the motor is restrained, the length of the shaft can be set further longer.

Further, it is further preferable that a stator which applies or is structured to apply a rotational force to the rotor is provided and a support part is provided which supports or is structured to support an output side end part of the shaft which is protruded from an output side end face of the stator.

As described above, when the shaft is protruded from the output side end face of the stator by a predetermined length, the length of the shaft can be increased by that amount and thus inclination of the shaft is restrained relatively small.

In order to attain the above advantages, at least an embodiment of the present invention provides a motor device including a shaft which is fixed with a rotor on its outer peripheral face, a stator which applies or is structured to apply a rotational force to the rotor, and a thrust pressurization part which supports or is structured to support an opposite-to-output side end part of the shaft while pressurizing the shaft in an axial direction. The thrust pressurization part includes a ball which is abutted with the opposite-to-output side end part of the shaft, a bearing member which supports or is structured to support the ball at a substantially center in a plane direction, and a bearing holding part which holds or is structured to hold the bearing member so as to surround an outer peripheral face of the bearing member. In addition, a center position in the axial direction of an engagement face where the bearing member and the bearing holding part are engaged with each other and a center position of the ball in the axial direction are coincided with each other.

According to the motor device in accordance with at least an embodiment of the present invention, the bearing member which holds or is structured to hold the ball abutting with the opposite-to-output side end part of the shaft is held in a state that the outer peripheral face of the bearing member is surrounded by the bearing holding part. In this structure, the center position in the axial direction of the engagement face where the bearing member and the bearing holding part are engaged with each other (face where the bearing member and the bearing holding part are overlapped with each other in the radial direction) is coincided with the center position of the ball. Therefore, even when the bearing member which holds or is structured to hold the ball is inclined within the bearing holding part, the position of the ball is not displaced. In other words, since the inclination of the shaft due to the inclination of the bearing member is prevented, a space between the rotor fixed to the shaft and the stator is not required to make larger and thus the size of the motor (stator) is restrained from being relatively large in the radial direction.

In this case, it may be structured that the thrust pressurization part is disposed on the inner side of the rotor.

According to this structure, the size of the motor device is prevented from becoming larger in the axial direction of the shaft by the amount of the size of the thrust pressurization part and thus the size of the motor device can be made small.

Further, it may be structured that the thrust pressurization part includes a coil spring which pressurizes or is structured to pressurize an opposite-to-output side end face of the bearing member in the axial direction and the bearing member includes an opposite-to-output side slide part which holds or is structured to hold the ball, and a reinforcing part which reinforces the opposite-to-output side slide part and is protruded to an opposite-to-output side, and that the coil spring and the bearing member are disposed so as to overlap with each other in the axial direction in a state that the reinforcing part is located on an inner side of the coil spring.

As described above, when the bearing member is provided with the reinforcing part for reinforcing the opposite-to-output side slide part, the position of the ball can be brought closer to the coil spring which is disposed on the oppositeto-output side of the bearing member and thus the length of the shaft can be increased by that amount. Therefore, inclination of the shaft due to a factor other than the inclination of the bearing member (for example, clearance between the ball and the opposite-to-output side slide part) is restrained to be small. Therefore, a space between the rotor and the stator can be set relatively small and thus the size in the radial direction of the motor device can be made small. In other words, in order to set the length of the shaft longer, the position of the ball for supporting the opposite-to-output side end part of the shaft is required to locate toward the opposite-to-output side as much as possible. However, in this case, the bottom face part of the opposite-to-output side slide part is relatively thin and its strength is lowered. Therefore, in at least an embodiment of the present invention, the reinforcing part is provided on the opposite-to-output side of the bearing member to ensure a sufficient mechanical strength of the opposite-to-output side slide part and, in addition, the reinforcing part is located on the inner side of the coil spring. Therefore, while restraining the increase of the total length of the motor, the length of the shaft can be set longer.

In order to attain the above advantages, at least an embodiment of the present invention provides a motor device including a shaft which is formed with a pinion on a portion that is protruded from an output side end face of a stator, and a support part which rotationally supports an output side end part of the shaft, and a driving force is transmitted through a gear which is engaged with the pinion. The support part includes an extended part which is made of metal and is protruded in a tongue piece-like shape from the output side end face of the stator, a slide part which is made of resin, formed at a tip end of the extended part and where the shaft is slid, and a connecting part which is made of resin and connected with the slide part and the stator so as to extend over the slide part and the stator.

According to the motor device in accordance with at least an embodiment of the present invention, the extended part which is formed with the slide part by which the shaft is supported is formed of metal whose mechanical strength is high and the extended part is reinforced by the connecting part which is provided so as to extend over the slide part and the stator. Therefore, occurrence of a trouble such as positional displacement of the support part (positional displacement of the slide part) which supports or is structured to support the shaft or detachment of the shaft from the support part can be prevented. Further, since the shaft is protruded from the output side end face of the stator, the length of the shaft can be set larger. Therefore, in comparison with a case that the length of the shaft is relatively short, when the positional displacements in the radial direction are the same amounts as each other, the inclination of the shaft is made smaller and thus a space between the outer wall of the rotor and the inner wall of the stator can be set smaller. Accordingly, the size in the radial direction can be reduced. Further, noise, vibration and torque loss during driving can be reduced.

In this case, it may be structured that a base end of the extended part and the connecting part are provided along an outer peripheral face of the shaft in a circumferential direction.

According to this structure, the base end of the extended part and the connecting part are not overlapped with each other in the radial direction of the shaft and thus the size of the motor device can be reduced in the radial direction.

Further, it may be structured that the thrust pressurization part which pressurizes or is structured to pressurize the opposite-to-output side end part of the shaft in the axial direction is provided and the thrust pressurization part is disposed on the inner side of the rotor.

As described above, in a case that the thrust pressurization part is further provided for pressurizing the opposite-to-output side end face of the shaft in the axial direction, when the thrust pressurization part is provided on the inner side of the rotor, the total length in the axial direction of the motor device can be restrained from being larger.

Further, it may be structured that the extended part, the slide part and the connecting part are integrally formed by insert molding.

According to this structure, the mechanical strength of the support part supporting the shaft is further improved. Especially, even if a stress is applied to the shaft in a direction perpendicular to the axial line, since the joining strength of the slide part and the connecting part with the extended part is large, a problem that the slide part and the connecting part are disengaged from the extended part is hard to occur.

According to the motor device in accordance with at least an embodiment of the present invention for attaining the above advantages, the thrust pressurization part which supports or is structured to support the opposite-to-output side end part of the shaft while pressurizing the shaft in the axial direction is disposed on the inner side of the rotor, the total length of the motor is prevented from being large due to providing the thrust pressurization part. Further, since the coil spring which is provided in the thrust pressurization part is accommodated on the inner side of the rotor, workability at the time of assembling is superior in comparison with a case that the thrust pressurization part is accommodated on an inner side of the shaft. Further, the diameter of the coil spring can be also set larger and thus a pressurization force to the shaft is secured sufficiently. Moreover, since the coil spring which is provided in the thrust pressurization part is formed in a conical shape, the length in the pressurization direction in a compressed state is shorter in comparison with a case that a coil spring having a normal cylindrical shape is used. In other words, since the coil spring is formed in a conical shape, when compressed, the small diameter part and the large diameter part of a coil wire structuring the coil spring is overlapped with each other in the axial direction and thus the size of the thrust pressurization part in the axial direction can be made relatively small. Therefore, the length of the shaft can be made relatively large without changing the size of the total length of the motor device in the axial direction and thus, in comparison with a case that the length of the shaft is relatively short, if the positional displacements in the radial direction are the same as each other, inclination of the shaft is relatively small. Further, noise, vibration, torque loss and the like are reduced.

According to the motor device in accordance with at least an embodiment of the present invention for attaining the above advantages, the center position of the engagement face where the bearing member and the bearing holding part are engaged with each other is coincided with the center position of the ball and thus, even when the bearing member which holds or is structured to hold the ball is inclined within the bearing holding part, the position of the ball is not displaced and thus the shaft supported in an abutted state with the ball does not incline. Therefore, a space between the rotor fixed to the shaft and the stator is not required to make larger and thus the size of the motor (stator) is restrained to be relatively large in the radial direction.

According to the motor device in accordance with at least an embodiment of the present invention for attaining the above advantages, the extended part which is made of metal and formed with the slide part by which the shaft is supported is reinforced by the connecting part which is provided so as to extend over the slide part and the stator and thus occurrence of a trouble such as positional displacement of the support part (positional displacement of the slide part) which supports or is structured to support the shaft or detachment of the shaft from the support part can be prevented.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 1(a) is an exploded perspective view showing a motor device which is viewed from an output side and FIG. 1(b) is an exploded perspective view showing the motor device which is viewed from an opposite-to-output side.

FIG. 2(a) is an exploded perspective view showing a motor main body which is viewed from an output side and FIG. 2(b) is an exploded perspective view showing the motor main body which is viewed from an opposite-to-output side.

FIG. 6(a) is a view showing a state where a bearing member is not inclined with respect to a bearing holding part, and FIG. 6(b) is a view showing a state where the bearing member is inclined within the bearing holding part.

DETAILED DESCRIPTION OF EMBODIMENTS

Embodiments of the present invention will be described in detail below with reference to the accompanying drawings.
[Embodiment 1]

Figure 1A:
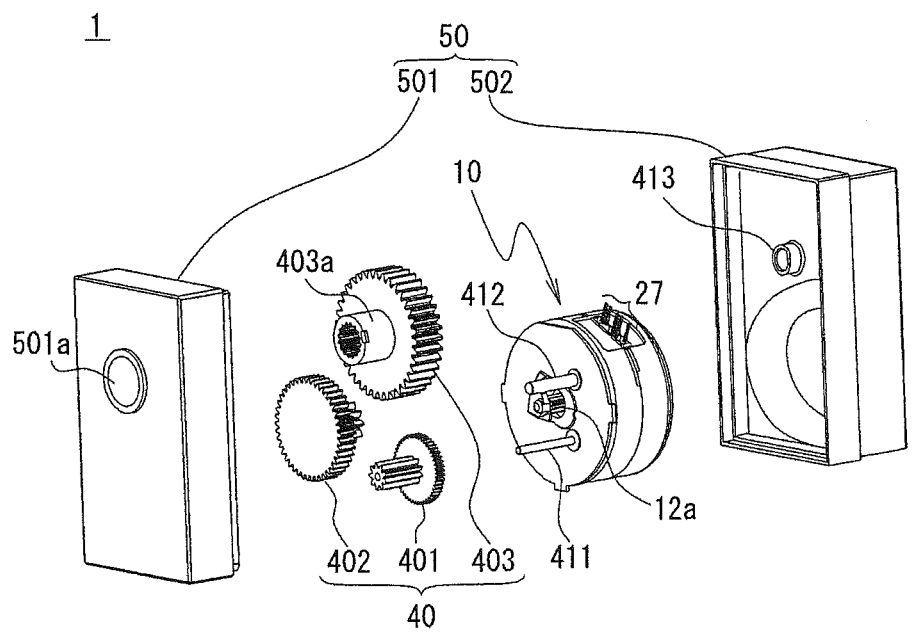
FIGS. 1(a) and 1(b) are exploded perspective views showing a motor device in accordance with at least an embodiment of the present invention.
Figure 1B:
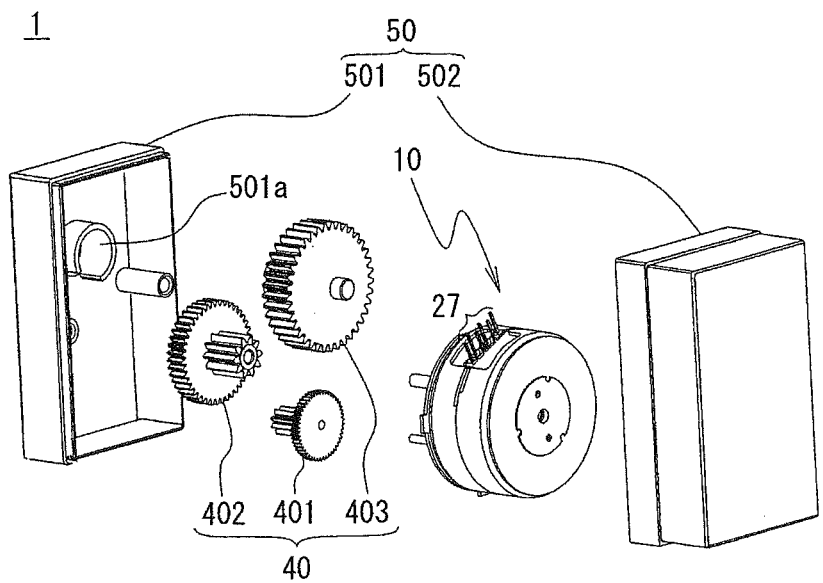
Figure 2A:
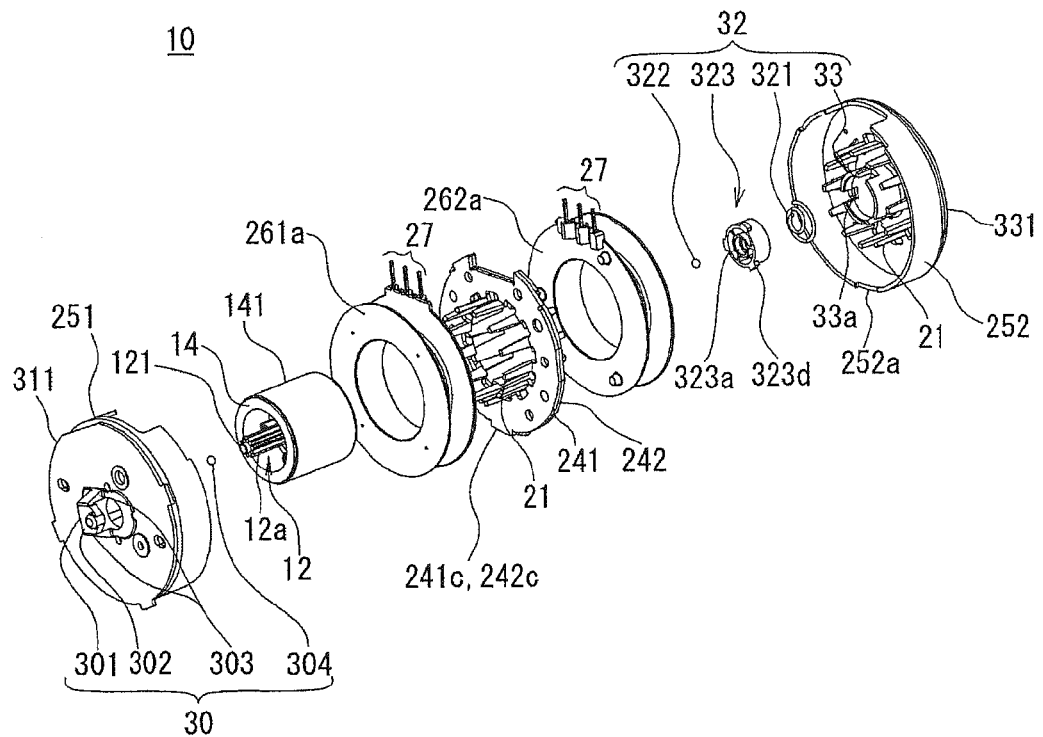
FIGS. 2(a) and 2(b) are exploded perspective views showing a motor main body provided in the motor device shown in FIGS. 1(a) and 1(b).
Figure 2B:
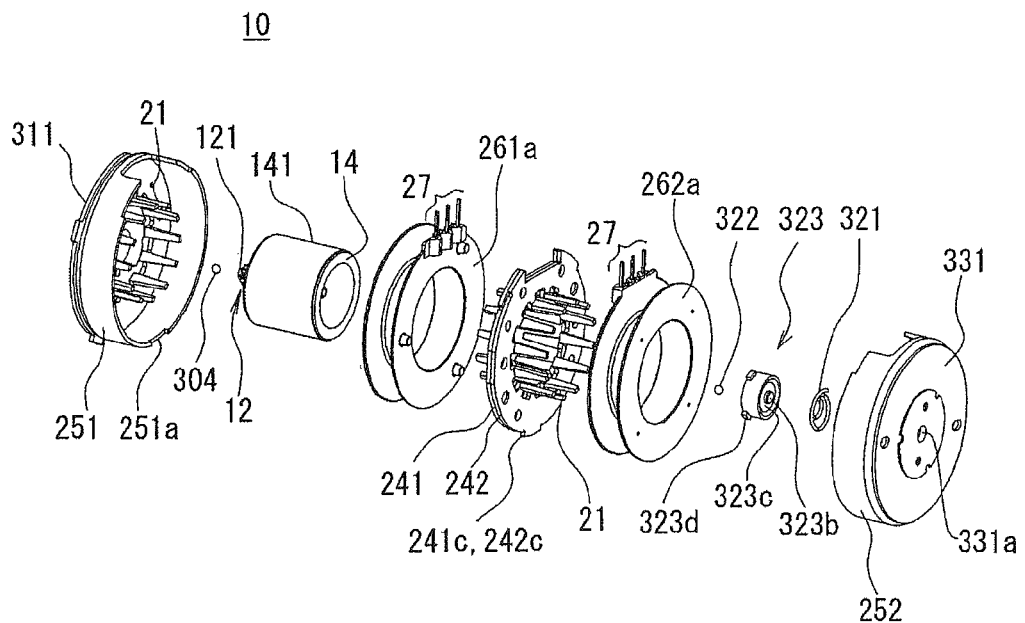
Figure 3:
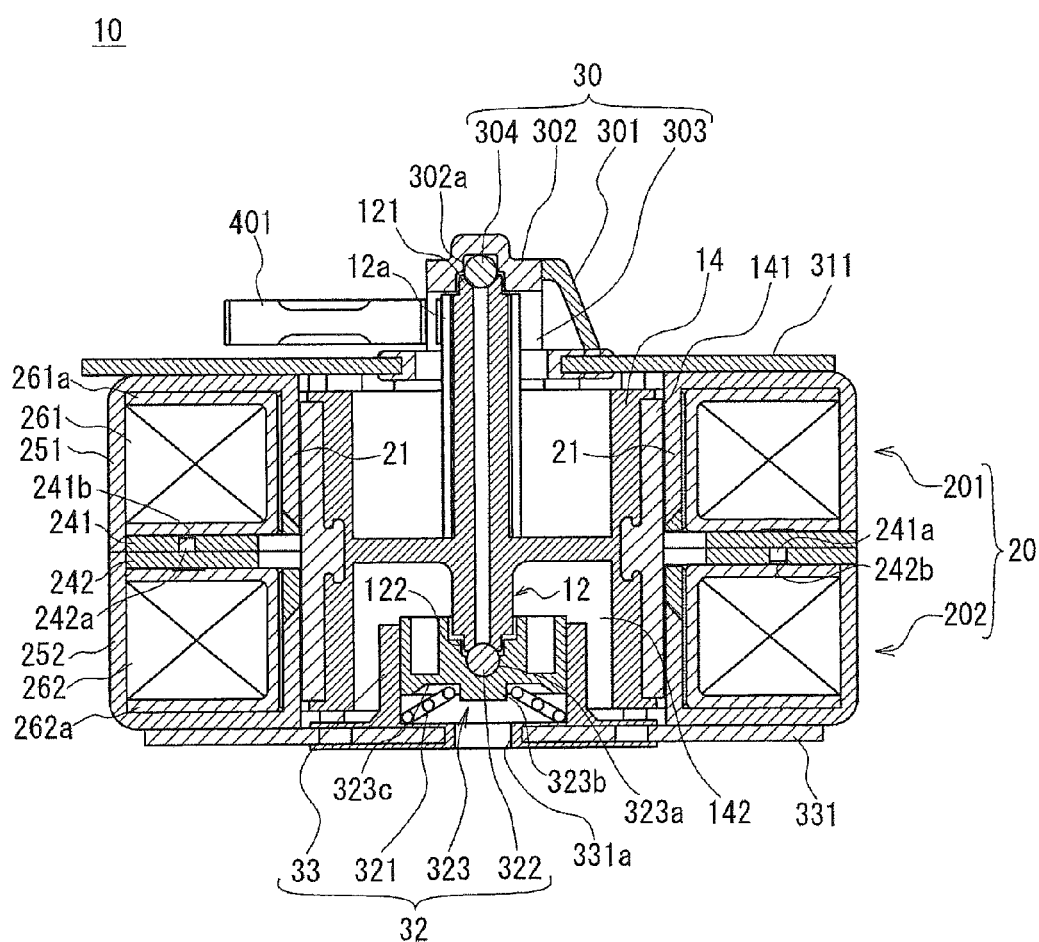
FIG. 3 is a cross-sectional view showing the motor main body in FIGS. 2(a) and 2(b).

FIGS. 1(a) and 1(b) are exploded perspective views showing a motor device 1 in accordance with at least an embodiment of the present invention. FIG. 1(a) is an exploded perspective view showing the motor device 1 which is viewed from an output side and FIG. 1(b) is an exploded perspective view showing the motor device 1 which is viewed from an opposite-to-output side. Further, FIGS. 2(a) and 2(b) are exploded perspective views showing a motor main body 10 provided in the motor device 1. FIG. 2(a) is an exploded perspective view showing the motor main body 10 which is viewed from an output side and FIG. 2(b) is an exploded perspective view showing the motor main body 10 which is viewed from an opposite-to-output side (drive coils 261 and 262 are not shown). FIG. 3 is a cross-sectional view showing the motor main body 10.

As shown in FIGS. 1(a) and 1(b), the motor device 1 in accordance with this embodiment is a so-called geared motor, which is provided with a motor main body 10, a gear part 40 and a case 50. A structure of the motor main body 10 will be specifically described below with reference to FIGS. 2(a) and 2(b) and FIG. 3.

The motor main body 10 is a so-called stepping motor, which is provided with a shaft 12, a stator 20, a support part 30 which supports or is structured to support an output side end part 121 of the shaft 12, and a thrust pressurization part 32 which supports or is structured to support an opposite-to-output side end part 122 of the shaft 12 while pressurizing the opposite-to-output side end part 122 of the shaft 12 in the axial direction.

A part of the shaft 12 is protruded to an output side from the stator 20 and an opposite-to-output side of the shaft 12 is fixed with a rotor 14. The rotor 14 is formed so that its cross section cut with a plane passing through a center axial line of the shaft 12 is a substantially "H" shape, and a permanent magnet 141 on which an "N"-pole and an "S"-pole are alternately magnetized in a circumferential direction is fixed to its outer peripheral side by an adhesive, insert molding or the like. Further, the shaft 12 is formed with a pinion 12a on an outer peripheral face of its output side (portion protruded at least from the stator 20 except an output side end part 121). The output side end part 121 of the shaft 12 is supported by a support part 30 provided on the output side and an opposite-to-output side end part 122 is supported by a thrust pressurization part 32. The support structure of the shaft 12 will be described in detail below.

The stator 20 is structured of a first stator assembly 201 and a second stator assembly 202 which face the outer peripheral face of the permanent magnet 141 and are disposed so as to be superposed on each other in the axial direction of the shaft 12.

The first stator assembly 201 and the second stator assembly 202 are respectively provided with drive coils 261 and 262 which are wound around coil bobbins 261a and 262a, inner stator cores 241 and 242, and outer stator cores 251 and 252.

Each of the inner stator cores 241 and 242 and the outer stator cores 251 and 252 is formed with a plurality of pole teeth 21 which are stood up in the axial direction with an equal interval from its inner circumferential edge. Specifically, a plurality of the pole teeth 21 which are formed in the inner stator core 241 and the outer stator core 251, and a plurality of the pole teeth 21 which are formed in the inner stator core 242 and the outer stator core 252 are alternately located in a juxtaposed manner on an inner peripheral side of the drive coils 261 and 262.

Further, outer circumferential edges of the outer stator cores 251 and 252 are formed to be bent and stood up so as to cover the outer peripheral faces of the drive coils 261 and 262 and the outer stator cores 251 and 252 function as a motor case. The motor case is formed in a cylindrical tube shape by drawing work.

In this embodiment, as shown in FIG. 3, the respective inner stator cores 241 and 242 are formed with inner stator core positioning protruded parts 241a and 242a and inner stator core positioning holes 241b and 242b, by which the inner stator cores 241 and 242 are assembled with each other in a predetermined positional relationship. Further, as shown in FIGS. 2(a) and 2(b), respective outer circumferential edges of the inner stator cores 241 and 242 are formed with stator positioning protruded parts 241c and 242c, which are engaged with stator positioning recessed parts 251a and 252a formed on outer circumferential edges of the outer stator cores 251 and 252 (motor case) to be assembled with each other in a predetermined positional relationship. The coil bobbins 261a and 262a around which the drive coils 261 and 262 are wound are disposed between the inner stator cores 241 and 242 and the outer stator cores 251 and 252.

The coil bobbins 261a and 262a are fixed with terminal pins 27 for supplying electrical power to the drive coils 261 and 262 and the terminal pins 27 are protruded from the outer peripheral face of the motor case. Coil ends of the drive coils 261 and 262 are bound to the terminal pins 27. Further, the stator 20 is provided with an output side flat plate 311 on its output side, in which a support part 30 described below is provided, and an opposite-to-output side flat plate 331 for fixing a thrust pressurization part 32 on its opposite-to-output side. The output side flat plate 311 and the opposite-to-output side flat plate 331 are made of metal and respectively fixed to an output side end face of the outer stator core 251 and to an opposite-to-output side end face of the outer stator core 252 of the stator, which are perpendicular to the axial line of the shaft 12, by welding or the like.

A support structure of the shaft 12 will be described in detail below. The output side end part 121 of the shaft 12 is supported by the support part 30 and its opposite-to-output side end part 122 is supported by the thrust pressurization part 32 while pressurized in the axial direction of the shaft 12.

The thrust pressurization part 32 is provided with a coil spring 321, a ball 322, a bearing member 323 and a bearing holding part 33 which holds or is structured to hold the bearing member 323. The opposite-to-output side end part 122 of the shaft 12 is abutted with the ball 322 made of metal and is supported by the ball 322 in a slidable state with an outer face of the ball 322 as a sliding face. The bearing member 323 is formed with an opposite-to-output side slide part 323a which is a recessed portion having a predetermined size and the ball 322 is rotatably held in the opposite-to-output side slide part 323a and the opposite-to-output side slide part 323a functions as a slide part of the opposite-to-output side bearing. As shown in FIG. 3, the ball 322 is held at a substantially center in the plane direction of the bearing member 323 (plane direction perpendicular to the axial line of the shaft 12). In this embodiment, since the shaft 12 is structured of resin which is integrally molded with the rotor 14, the ball 322 that is hard to be abraded is used as a slide member. However, when the shaft 12 which is insert-molded to the rotor 14 is metal such as stainless steel, the opposite-to-output side end part 122 of the shaft 12 may be formed in a curved surface shape and slidably supported by the opposite-to-output side slide part 323a with the opposite-to-output side end part 122 as a sliding face.

The bearing member 323 is held by the bearing holding part 33 provided on an output side face of an opposite-to-output side flat plate 331 which is fixed to the opposite-to-output side end face of the outer stator core 252. An outward appearance view of the opposite-to-output side flat plate 331 is shown in FIG. 5.

The bearing holding part 33 is a cylindrical tube shaped member made of resin in which a size of its inner diameter is formed slightly larger than an outer diameter of the bearing member 323 and integrally formed with the opposite-to-output side flat plate 331 by insert molding. As shown in FIG. 3, the coil spring 321 is disposed within the bearing holding part 33 formed in a cylindrical tube shape and the bearing member 323 is disposed on the output side of the coil spring 321.

Figure 5:
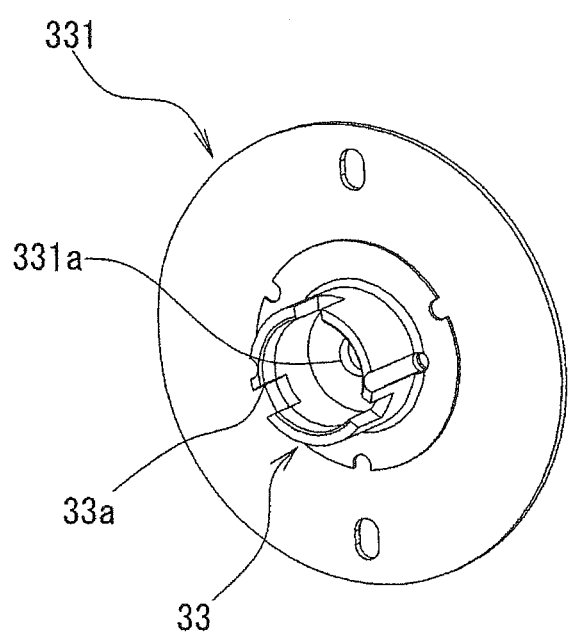
FIG. 5 is an outward appearance view showing an opposite-to-output side flat plate which is provided in the motor main body shown in FIGS. 2(a) and 2(b) and FIG. 3.

In this embodiment, as shown in FIG. 5, the bearing holding part 33 is formed with cut-out parts 33a with an equal interval in a circumferential direction (three cut-out parts in this embodiment). Further, as shown in FIG. 2, the outer peripheral face of the bearing member 323 is formed with protruded parts 323d with the same interval as the bearing holding part 33. Therefore, the bearing member 323 is held by the bearing holding part 33 in a state that the protruded parts 323d are engaged with the cut-out parts 33a. In this manner, turning of the bearing member 323 is prevented (turning prevention mechanism for the bearing member 323 is structured). On the other hand, the outer peripheral face of the bearing member 323 is held so as to slide in the axial direction of the shaft 12 along the inner peripheral face of the bearing holding part 33.

The bearing member 323 which is held as described above is urged to the output side by the coil spring 321 that is abutted with the opposite-to-output side end face 323c of the bearing member 323. In this manner, the shaft 12 is rotatably supported while pressurized in the axial direction through the bearing member 323 and the ball 322. In this embodiment, a hole 331a is formed at the center of the opposite-to-output side flat plate 331 and the hole 331a functions as an air escape route when the bearing member 323 is to be inserted and attached to the bearing holding part 33. Further, when the hole 331a is provided, the volume of resin structuring the bearing holding part 33 is decreased and the like and thus a molding defect such as shrinkage is hard to occur.

The thrust pressurization part 32 which is structured as described above is disposed on the inner side of the rotor 14. Specifically, as shown in FIG. 3, the thrust pressurization part 32 is disposed within a thrust pressurization part arrangement space 142 which is structured by the opposite-to-output side flat plate 331 fixed on the opposite-to-output side end face of the stator 20 and a recessed part on the opposite-to-output side of the rotor 14 whose cross section is formed in roughly "H" shape. According to this structure, the thrust pressurization part 32 is disposed on the inner side with respect to the outer peripheral face of the rotor 14 in the radial direction of the rotor 14. Further, in the axial direction of the shaft 12, the thrust pressurization part 32 is disposed on the inner side with respect to the opposite-to-output side flat plate 331 which is fixed to the opposite-to-output side end face of the stator 20. Therefore, since the thrust pressurization part 32 is provided on the inner side of the thrust pressurization part arrangement space 142, the total length of the motor main body 10 is not increased in the axial direction of the shaft 12.

In addition, the coil spring 321 which is used in this embodiment is a cone-shaped coil spring in which a spiral shape of a spring wire structuring the coil spring is formed to gradually become smaller in the radial direction along the axial direction of the coil spring. According to this structure, while securing a pressurization force having a required magnitude for the bearing member 323, the size of the thrust pressurization part 32 in the axial direction can be made smaller in comparison with a case that a coil spring having a normal shape (coil spring whose spiral shape of a spring wire is in a cylindrical shape) is used. In other words, since the coil spring 321 is formed in a conical shape, when compressed, a small diameter part and a large diameter part of the coil wire structuring the coil spring can be juxtaposedly arranged in the axial direction. Specifically, a winding length of the coil spring generating the same spring force (length of the coil spring 321 in the axial direction in this embodiment) can be shortened and thus the size of the thrust pressurization part 32 in the axial direction can be made relatively small. Therefore, without changing the size of the total length of the motor main body 10 in the axial direction of the shaft 12, the length of the shaft 12 which is pressurized by the coil spring 321 can be increased and thus, in comparison with a case that the length of the shaft 12 is relatively short, inclination of the shaft 12 is restrained small when the positional displacements in the radial direction are the same as each other. As a result, a space between the outer wall of the permanent magnet 141 which is fixed in the outer periphery of the rotor 14 and the inner walls of the pole teeth 21 are set to be relatively small and thus the size in the radial direction of the motor device 1 can be reduced. Moreover, noise, vibration and torque loss during driving the motor are reduced.

In other words, according to this embodiment, since the thrust pressurization part 32 is provided on the inner side of the rotor 14, the size of the motor main body 10 in the axial direction of the shaft 12 is restrained to be large. On the other hand, reduction of the length of the shaft 12 due to providing the thrust pressurization part 32 in the inside of the rotor 14 can be restrained as much as possible by using the coil spring 321 formed in a conical shape.

Further, a reinforcing part 323b is formed so as to protrude to the opposite-to-output side at a substantially center of the opposite-to-output side end face 323c of the bearing member 323, in other words, on the opposite side of the opposite-to-output side slide part 323a. The reinforcing part 323b is formed for reinforcing the mechanical strength of the bearing member 323 which is lowered by providing the opposite-to-output side slide part 323a that is a recessed portion. Especially, the reinforcing part 323b is formed for reinforcing a portion from the bottom face of the opposite-to-output side slide part 323a to the opposite-to-output side end face 323c whose thickness is relatively thin.

As shown in FIG. 3, the reinforcing part 323b is formed smaller than an inner diameter of a tip end on an output side of the cone-shaped coil spring 321 and located on the inner side of the coil spring 321. According to this structure, the mechanical strength of the bearing member 323 is secured by the reinforcing part 323b without changing the total length of the motor main body 10 in the axial direction of the shaft 12.

Further, since the reinforcing part 323b is located on the inner side of the coil spring 321, the reinforcing part 323b acts as a member for preventing positional displacement of the coil spring 321. Therefore, the pressurizing position of the coil spring 321 to the bearing member 323 is not displaced largely (pressurizing position is not de-centered). In this manner, occurrence of a problem such as inclination of the bearing member 323 or shortage of pressurization to the bearing member 323 (shaft 12) can be prevented.

Figure 6A:
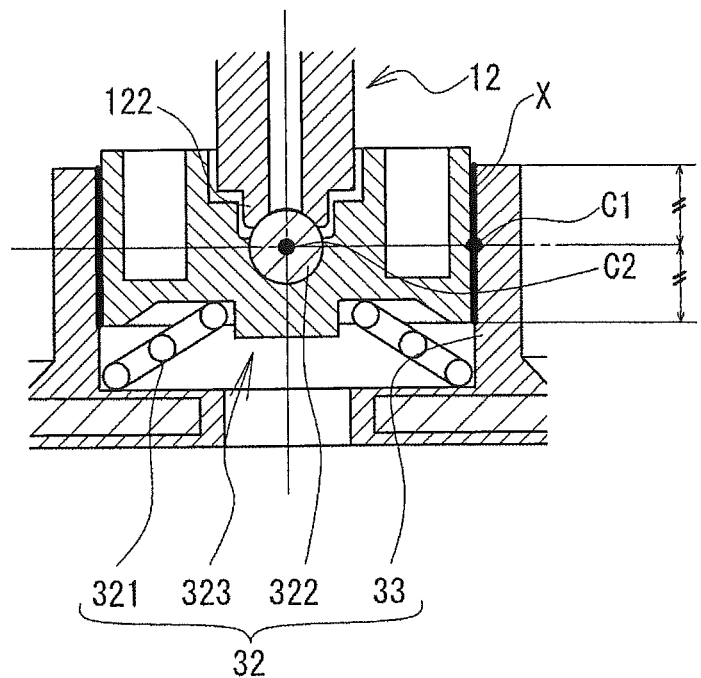
FIGS. 6(a) and 6(b) are enlarged cross-sectional views showing a thrust pressurization part.

Further, as described above, the bearing member 323 is held by the bearing holding part 33 formed in a tube-like shape. In this case, the bearing member 323 is held in a positional relationship with the ball 322 which is abutted with the shaft 12 as described below. FIG. 6(a) is an enlarged cross sectional view showing the thrust pressurization part 32. As shown in FIG. 6(a), the center position (point "C1" in FIG. 6(a)) of an engagement face (portion shown by the thick line "X" in FIG. 6(a)) of the outer peripheral face of the bearing member 323 with the inner peripheral face of the bearing holding part 33 and the center position of the ball 322 (point "C2" in FIG. 6(a)) are coincided with each other in the axial direction of the shaft 12 in a state that the bearing member 323 is not inclined during driving of the motor device 1 (normal state).

Figure 6B:
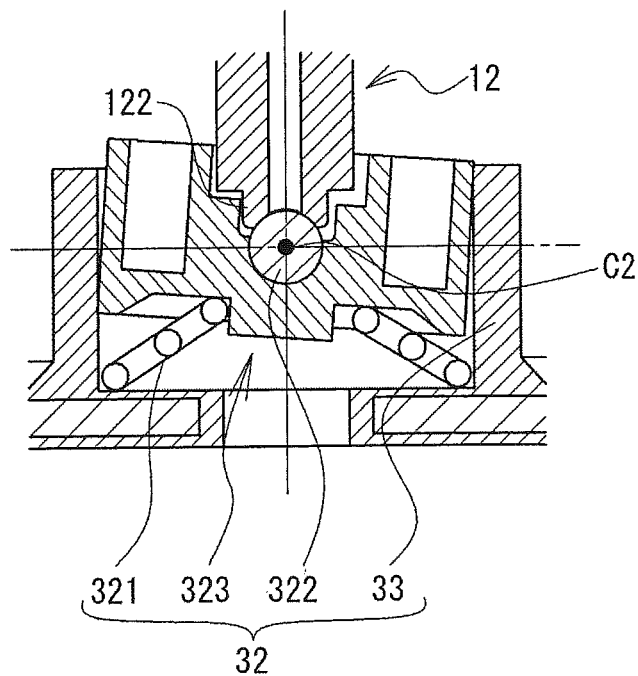
Figure 7:
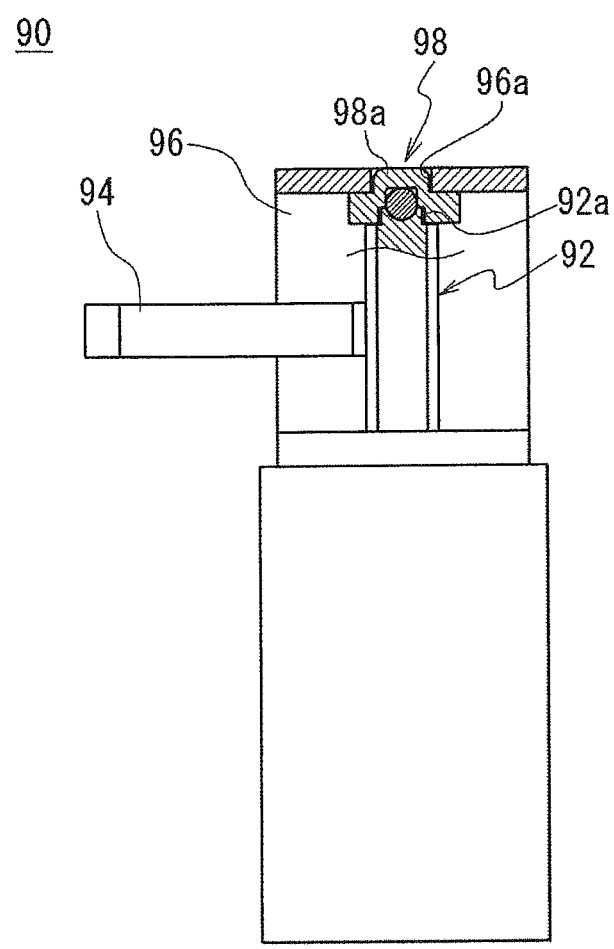
FIG. 7 is a schematic view for explaining problems in a conventional motor device.

According to this structure, the following effects are obtained. In other words, in order to apply a pressurization force of the coil spring 321 to the shaft 12 through the bearing member 323 and the ball 322, a minute clearance is formed between the outer peripheral face of the bearing member 323 and the inner peripheral face of the bearing holding part 33. Therefore, as shown in FIG. 6(b), the bearing member 323 may be in an inclined state within the bearing holding part 33. However, as understood when compared FIG. 6(a) with FIG. 6(b), even when the bearing member 323 is inclined, the position of the ball 322 is not displaced because the center position "C1" of the engagement face "X" in the axial direction of the shaft 12 and the center position "C2" of the ball 322 are coincided with each other. Therefore, even when the bearing member 323 is inclined, the shaft 12 abutted with the ball 322 is not inclined. Accordingly, a space between the rotor 14 and the stator 20 is not required to increase and thus the dimension in the radial direction of the motor device 1 (motor main body 10) can be reduced. In accordance with an embodiment of the present invention, when a sliding face of the opposite-to-output side end part 122 of the shaft 12 is slid on the opposite-to-output side slide part 323a, the position of the opposite-to-output side end part 122 is set to coincide with the center position "C1" of the engagement face "X" in the axial direction. In this case, similar effects are obtained.

The bearing member 323 is provided with a shaft slide part, which is formed in a cylindrical tube shape and provided with the opposite-to-output side slide part 323a and the reinforcing part 323b at its center part, and a bearing holding part slide part whose outer peripheral face in a cylindrical shape is a sliding face on the bearing holding part 33. Further, the bearing member 323 is provided with a bottom part, which connects opposite-to-output sides of the shaft slide part and the bearing holding part slide part with each other, and partition connecting parts which connect the shaft slide part with the bearing holding part slide part on the output side with respect to the bottom part along a peripheral face in the axial line of the shaft 12 equally. In addition, space parts are provided which are partitioned by the partition connecting parts and opened to the output side. The shaft slide part, the bearing holding part slide part, the bottom part and the connecting parts of the bearing member 323 are integrally molded by resin molding. Since the space parts opened to the output side are provided, volume of resin at the time of molding of the bearing member 323 is decreased and the like and thus molding defect such as shrinkage is hard to occur. The bottom part and the partition connecting parts prevent lowering of strength due to the space part.

In this embodiment, a space between the outer peripheral face of the shaft 12 and the inner peripheral face of the bearing member 323 is set to be a dimension so that, even when the shaft 12 is inclined, the shaft 12 is not abutted with the bearing member 323.

Figure 4A:
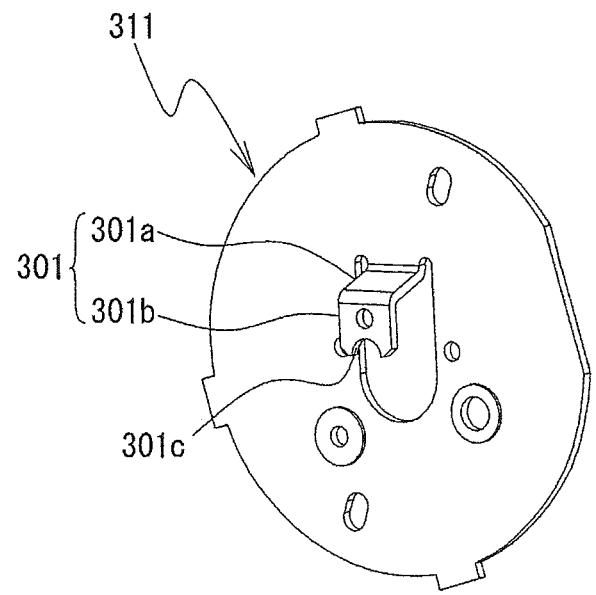
FIG. 4(a) is an outward appearance view showing an output side flat plate which is provided in the motor main body shown in FIGS. 2(a) and 2(b) and FIG. 3.
Figure 4B:
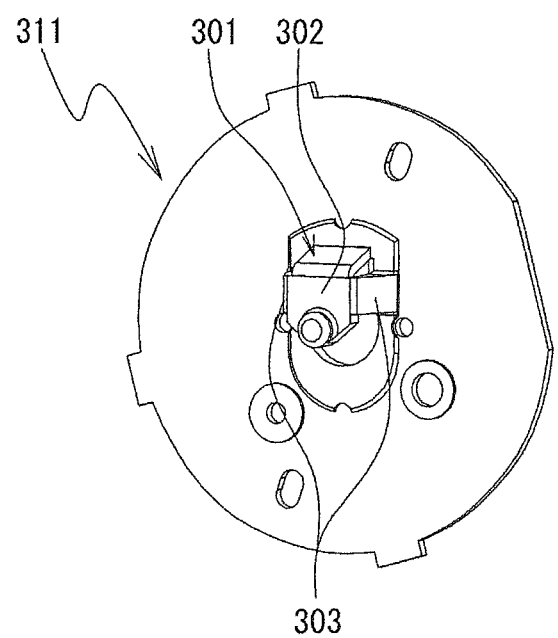
FIG. 4(b) is an outward appearance view showing the output side flat plate to which a slide part and connecting parts are insert-molded.

On the other hand, the output side of the shaft 12 is protruded by a predetermined length from the output side end face of the stator 20 and the output side end part 121 of the shaft 12 is supported by the support part 30. The structure of the support part 30 will be described below with reference to FIGS. 4(a) and 4(b) in addition to FIGS. 2(a) and 2(b) and FIG. 3. FIG. 4(a) is an outward appearance view showing the output side flat plate 311 and FIG. 4(b) is an outward appearance view showing the output side flat plate 311 to which a slide part 302 and connecting parts 303 are insert-molded.

The support part 30 rotationally supports the output side end part 121 of the shaft 12 which is protruded by a predetermined length from the output side end face of the stator 20. The structure of the support part 30 will be described below with reference to FIGS. 4(a) and 4(b) in addition to FIGS. 2(a) and 2(b) and FIG. 3. FIG. 4(a) is an outward appearance view showing the output side flat plate 311 and FIG. 4(b) is an outward appearance view showing the output side flat plate 311 to which a slide part 302 and connecting parts 303 are insert-molded.

The support part 30 is provided with an extended part 301, a slide part 302, connecting parts 303 and a ball 304. The extended part 301 is protruded to the output side from the output side flat plate 311. As shown in FIG. 4(a), the extended part 301 is structured of a base end 301*a* and a tip end 301*b*. Specifically, the base end 301*a* is protruded by a specified quantity from the output side flat plate 311 and the tip end 301*b* is bent at a predetermined angle with respect to the base end 301*a* so that the tip end 301*b* is substantially parallel to a plane direction of the output side flat plate 311. A semicircular cut-out part 301*c* is formed in an end part of the tip end 301*b*.

The slide part 302 is formed at the tip end 301*b* of the extended part 301. Further, two connecting parts 303 are formed so as to extend over the slide part 302 and the output side flat plate 311 (stator 20).

The slide part 302 is provided with an output side slide part 302*a* which is formed by using a recessed portion having a predetermined size. The output side end part 121 of the shaft 12 is rotatably supported by a ball 304 which is made of metal and held by the output side slide part 302*a*. In this embodiment, since the shaft 12 is structured of resin which is integrally molded with the rotor 14, the ball 304 that is hard to be abraded is used as a slide member. However, when the shaft 12 is metal such as stainless steel, it may be structured that the rotor 14 is insert-molded and the output side end part 121 of the shaft 12 is formed in a curved surface shape and slidably supported by the slide part 302 with the output side end part 121 as a sliding face.

The connecting part 303 connects the slide part 302 (tip end 301*b* of the extended part 301) with the output side flat plate 311 to reinforce the extended part 301 and thus the mechanical strength of the support part 30 is improved. Especially, in a case that the shaft 12 urged to the output side is supported as described in this embodiment, when the mechanical strength is insufficient, the shaft 12 may be inclined or the shaft may be detached from the support part 30. However, in this embodiment, since the connecting parts 303 are provided so as to form a bridge in the direction where the shaft 12 is urged, occurrence such as deformation or damage of the extended part 301 is prevented.

The connecting parts 303 are integrally formed with the extended part 301 by insert molding together with the slide part 302. Therefore, the mechanical strength of the support part 30 which supports or is structured to support the shaft 12 is remarkably improved.

Further, the connecting parts 303 are formed to be located on the outer peripheral face side of the shaft 12. Similarly, the base end 301*a* of the extended part 301 is formed to be located on the outer peripheral face side of the shaft 12. Further, the connecting parts 303 and the base end 301*a* of the extended part are juxtaposedly arranged in the circumferential direction along the outer peripheral face of the shaft 12. In other words, they are disposed so as not to overlap with each other in the radial direction of the shaft 12 and thus the size of the motor main body 10 is restrained from increasing in the radial direction.

In the motor device 1 in accordance with this embodiment, a driving force of the motor main body 10 which is structured as described above is outputted to the outside through a gear part 40 structured of a plurality of gears. As shown in FIGS. 1(*a*) and 1(*b*), this embodiment is structured so that a driving force of the motor is transmitted from a first gear 401 engaged with the pinion 12*a* of the shaft 12 to a third gear 403 having an outside output shaft 403*a* through a second gear 402. The first gear 401 and the second gear 402 are supported by a first support shaft 411 and a second support shaft 412 which are respectively provided on the motor main body 10, and the third gear 403 is supported by a third support shaft 413 which is provided on a case 50 (second case 502).

When the gear part 40 is structured as described above, a load is applied to the pinion 12*a* of the shaft 12 in a direction perpendicular to the axial direction of the shaft 12. In this embodiment, as described above, the mechanical strength of the extended part 301 which supports or is structured to support the output side end part 121 of the shaft 12 is sufficiently secured by the connecting parts 303 and thus malfunction such as inclination or disengagement of the shaft 12 due to the external force is also prevented. The structure of the gear part 40 is only an example and may be appropriately modified depending on an object to be driven by the motor device 1.

The motor device 1 is structured so that the motor main body 10 and the gear part 40 are accommodated in a case 50 (first case 501 and second case 502) made of resin. The first case 501 is formed with a shaft hole 501*a*. An outside output shaft 403*a* provided in the third gear 403 is protruded from the shaft hole 501*a* and the outside output shaft 403*a* is mechanically connected with an object to be driven not shown.

[Industrial Applicability]

According to the motor device 1 which is structured as described above in accordance with at least an embodiment of the present invention, the following effects are mainly attained with respect to the above advantages. In other words, the thrust pressurization part 32 which supports or is structured to support the opposite-to-output side end part 122 of the shaft 12 while pressurizing the opposite-to-output side end part 122 of the shaft 12 in the axial direction is disposed on the inner side of the rotor 14 and thus the thrust pressurization part 32 does not make the total length of the motor main body 10 larger. Moreover, the coil spring 321 provided in the thrust pressurization part 32 is formed in a conical shape and thus, in comparison with a case that a normal coil spring is used, its compressed length in the pressurizing direction becomes relatively small. Therefore, the length of the shaft 12 which is pressurized by the coil spring 321 can be set longer by that shortened amount of the coil spring 321 and thus inclination of the shaft 12 can be restrained and noise, vibration, torque loss and the like are reduced at the time of driving of the motor device 1.

Further, the bearing member 323 is provided with the reinforcing part 323*b* which mechanically reinforces the opposite-to-output side slide part 323*a* for holding the ball 322. Therefore, the position of the ball 322 is capable of locating closer to the coil spring 321 which is disposed on the opposite-to-output side of the bearing member 323 and thus the length of the shaft 12 can be increased by that amount and the inclination of shaft 12 is restrained relatively small. Further, since the reinforcing part 323*b* is provided so as to be located on the inner side of the coil spring 321, the total length of the motor main body 10 is not increased even when the reinforcing part 323*b* is provided. In other words, according to this embodiment, while the size of the total length of the motor main body 10 is maintained, the strength of the bearing member 323 is secured by the reinforcing part 323*b* and thus the length of the shaft 12 is capable of being set larger.

Further, the motor device 1 is provided with the support part 30 which is capable of supporting the output side end part 121 that is protruded from the output side end face of the stator 20. Since the shaft 12 is protruded from the output side end face of the stator 20 by a predetermined length as described above, the length of the shaft 12 can be increased by that amount and inclination of the shaft 12 is restrained.

Further, the following effects are mainly attained with respect to the above advantages. In other words, the bearing member 323 which holds or is structured to hold the ball 322 that is abutted with the opposite-to-output side end part 122 of the shaft 12 provided in the motor device 1 is held by the bearing holding part 33 formed in a cylindrical tube shape in a state that its outer peripheral face is surrounded by the bearing holding part 33. In this structure, the center position point "C1" of the engagement face "X" where the bearing member 323 and the bearing holding part 33 are engaged with each other (face where the bearing member and the bearing holding part are overlapped with each other in the radial direction) is coincided with the center position point "C2" of the ball 322. Therefore, even when the bearing member 323 which holds or is structured to hold the ball 322 is inclined within the bearing holding part 33, the position of the ball 322 is not displaced and the shaft 12 supported in an abutted state with the ball 322 is not inclined. Accordingly, a space between the rotor 14 fixed to the shaft 12 and the stator 20 is not required to increase and thus the size of the motor device 1 (motor main body 10) is restrained from increasing in the radial direction.

Further, in this embodiment, the thrust pressurization part 32 urging the shaft 12 in the axial direction is disposed on the inner side of the rotor 14 which is fixed to the shaft 12. Therefore, the size of the motor device 1 (motor main body 10) is prevented from becoming larger in the axial direction of the shaft 12 by the amount of the size of the thrust pressurization part 32 and thus the size of the motor device 1 can be reduced.

Further, the thrust pressurization part 32 is provided with the coil spring 321 which pressurizes or is structured to pressurize the opposite-to-output side end part 122 of the shaft 12 and the bearing member 323 and the coil spring 321 are disposed so as to overlap with each other in the axial direction of the shaft 12. Therefore, while restraining increase of size in the radial direction of the motor device 1 (motor main body 10), the shaft 12 is supported in a stable state.

With respect to the above advantages, the following effects are mainly attained. In other words, the extended part 301 where the slide part 302, by which the shaft 12 is supported, is formed is formed of metal whose mechanical strength is high and the extended part 301 is reinforced by the connecting parts 303 which are provided so as to extend over the slide part 302 and the stator 20 (output side flat plate 311). Therefore, occurrence of a trouble such as positional displacement of the support part 30 supporting the shaft 12 (positional displacement of the slide part 302) and disengagement of the shaft 12 from the support part 30 can be prevented.

Further, since the support part 30 is protruded from the output side end face of the stator 20, the length of the shaft 12 is set longer by that amount. Therefore, inclination of the shaft 12 becomes relatively small, and noise, vibration and torque loss at the time of driving can be reduced.

Further, the base end 301a of the extended part 301 and the connecting parts 303 reinforcing the extended part 301 are provided so as to juxtapose in the circumferential direction along the outer peripheral face of the shaft 12. Therefore, the base end of the extended part 301 and the connecting parts 303 are not located so as to overlap each other in the radial direction of the shaft 12 and thus increase of the size of the motor device 1 in the radial direction is restrained.

Further, the thrust pressurization part 32 which pressurizes or is structured to pressurize the opposite-to-output side end part 122 of the shaft 12 in the axial direction for preventing positional displacement of the shaft 12 is disposed on the inner side of the rotor 14. Therefore, increase of the total length of the motor device 1 is restrained even when the thrust pressurization part 32 is provided.

Further, the extended part 301, the slide part 302 and the connecting parts 303 are integrally formed by insert molding and thus mechanical strength of the support part 30 which supports or is structured to support the shaft 12 is further improved. Especially, like the motor device 1 in accordance with this embodiment, even when it is structured that the shaft 12 is applied with stress in a direction perpendicular to the axial line by means of that the first gear 401 is engaged with the pinion 12a formed on the shaft 12, since joining strength of the slide part 302 and the connecting parts 303 with the extended part 301 is large, the slide part 302 and the connecting parts 303 are prevented from detaching from the extended part 301.

Although the present invention has been shown and described with reference to a specific embodiment, various changes and modifications will be apparent to those skilled in the art from the teachings herein.

For example, the motor main body 10 provided in the motor device 1 in accordance with this embodiment is a stepping motor but the present invention may be applied to other types of motors such as a DC motor.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A motor device comprising:
   a motor main body which is provided with a stator and a rotor;
   a gear part which is driven by the rotor and through which a driving force is outputted to an outside of the motor device;
   a case accommodating the motor main body and the gear part;
   a shaft which is fixed with the rotor on an outer peripheral face of the shaft and is formed with a pinion on a portion that is protruded from an output side end face of a stator; and
   a support part structured to support an output side end part of the shaft; and
   an output side flat plate which is made of metal and is fixed to an output side end face of the stator;
   wherein a gear of the gear part is engaged with the pinion for outputting the driving force to the outside;
   wherein the support part comprises:
      an extended part which is bent so as to protrude in a tongue piece-like shape from the output side flat plate toward the output side end part of the shaft;
      a slide part which is made of resin and formed at a tip end of the extended part, and the slide part being slid on the shaft; and
      connecting parts which are made of resin and connected with the slide part and the output side flat plate, the connecting parts being separately disposed on opposite sides of the extended part so as to reinforce the extended part by extending over the slide part and the output side flat plate.

2. The motor device according to claim 1, wherein a base end of the extended part and the connecting parts are provided along an outer peripheral face of the shaft in a circumferential direction.

3. The motor device according to claim 2, wherein the extended part, the slide part and the connecting parts are integrally formed by insert molding.

4. The motor device according to claim 2, further comprising a thrust pressurization part structured to pressurize an opposite-to-output side end part of the shaft in an axial direction,
wherein the thrust pressurization part is disposed on an inner side of the rotor.

5. The motor device according to claim 4, wherein the extended part, the slide part, and the connecting parts are integrally formed by insert molding.

6. The motor device according to claim 4, wherein
the thrust pressurization part comprises:
a coil spring which is formed in a conical shape and pressurizes the opposite-to-output side end part of the shaft in the axial direction;
a ball which is abutted with the opposite-to-output side end part of the shaft; and
a bearing member which supports the opposite-to-output side end part of the shaft through the ball and is pressurized by the coil spring in the axial direction; and
the bearing member comprises:
an opposite-to-output side slide part which holds the ball; and
a reinforcing part which reinforces the opposite-to-output side slide part and is protruded to an opposite-to-output side; and
the reinforcing part is disposed on an inner side of the coil spring.

7. The motor device according to claim 4, wherein the thrust pressurization part comprises:
a ball which is abutted with the opposite-to-output side end part of the shaft;
a bearing member which supports the ball at a substantially center position in a plane direction; and
a bearing holding part which holds the bearing member so as to surround an outer peripheral face of the bearing member; and
wherein a center position in the axial direction of an engagement face where the bearing member and the bearing holding part are engaged with each other and a center position of the ball in the axial direction are coincided with each other.

8. The motor device according to claim 4, wherein gears of the gear part including the gear engaged with the pinion are supported between the output side flat plate and the case so as to be parallel to the shaft.

9. The motor device according to claim 4, wherein
the stator comprises a stator assembly which is provided with an inner stator core, an outer stator core, and a coil bobbin that is disposed between the inner stator core and the outer stator core and around which a drive coil is wound, and
the output side flat plate is fixed to an output side end face of the outer stator core.

* * * * *